US008625547B1

(12) United States Patent
Miller, II (10) Patent No.: US 8,625,547 B1
(45) Date of Patent: Jan. 7, 2014

(54) TWO-TIER WIRELESS BROADBAND ACCESS NETWORK (75) Inventor: Robert Raymond Miller, II, Convent Station, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 956 days.

(21) Appl. No.: 11/371,578

(22) Filed: Mar. 9, 2006

Related U.S. Application Data (60) Provisional application No. 60/660,786, filed on Mar. 11, 2005, provisional application No. 60/661,567, filed on Mar. 14, 2005.

(51) Int. Cl.
*H04W 4/00* (2009.01)
*H04B 7/00* (2006.01)

(52) U.S. Cl.
USPC ...... 370/338; 370/328; 370/310.2; 455/422.1

(58) Field of Classification Search
USPC ............... 370/310.2, 328, 338; 455/422.1
See application file for complete search history.

(56) References Cited

U.S. PATENT DOCUMENTS

| | | | |
|---|---|---|---|
| 5,684,801 A | 11/1997 | Amitay et al. | |
| 5,815,116 A * | 9/1998 | Dunbridge et al. | 342/373 |
| 5,825,759 A * | 10/1998 | Liu | 370/331 |
| 5,838,730 A * | 11/1998 | Cripps | 375/272 |
| 5,890,055 A * | 3/1999 | Chu et al. | 455/16 |
| 6,223,055 B1 * | 4/2001 | Cyr | 455/555 |
| 6,239,888 B1 * | 5/2001 | Willebrand | 398/129 |
| 6,345,043 B1 | 2/2002 | Hsu | |
| 6,584,146 B2 | 6/2003 | Bose et al. | |
| 6,643,504 B1 | 11/2003 | Chow et al. | |
| 6,904,024 B1 * | 6/2005 | Boch et al. | 370/310.1 |
| 7,392,050 B2 * | 6/2008 | Svensson et al. | 455/435.3 |
| 2001/0036834 A1 * | 11/2001 | Das et al. | 455/458 |
| 2002/0075844 A1 * | 6/2002 | Hagen | 370/351 |
| 2002/0077151 A1 * | 6/2002 | Matthews et al. | 455/561 |
| 2002/0105931 A1 * | 8/2002 | Heinonen et al. | 370/338 |
| 2002/0114383 A1 * | 8/2002 | Belge et al. | 375/222 |
| 2002/0136232 A1 | 9/2002 | Dudziak et al. | |
| 2002/0146980 A1 * | 10/2002 | Solondz et al. | 455/21 |
| 2002/0177460 A1 * | 11/2002 | Beasley et al. | 455/502 |
| 2002/0181427 A1 * | 12/2002 | Sparr et al. | 370/338 |
| 2003/0058827 A1 | 3/2003 | Chow et al. | |
| 2003/0086437 A1 | 5/2003 | Benveniste | |
| 2003/0117973 A1 | 6/2003 | Thermond et al. | |
| 2003/0174690 A1 | 9/2003 | Benveniste | |
| 2003/0188006 A1 * | 10/2003 | Bard | 709/232 |
| 2003/0200183 A1 | 10/2003 | Sato | |

(Continued)

*Primary Examiner* — Marisol Figueroa
(74) *Attorney, Agent, or Firm* — Toler Law Group, PC (57) ABSTRACT

A wireless access network is based on a two-tier access point (AP) structure to provide effective and efficient wireless communication into an individual home/office building. A first tier of the network utilizes "neighborhood" APs, relatively low power, and utilized to provide wireless communication with a "nanocell" boundary (e.g., 300-1000 feet). A second tier of the network utilizes a set of "network concatenation devices" (window bridge), with a separate network concatenation device at each permanent facility in the nanocell that houses wireless devices. The network concatenation device is attached to a window, for example, of a home in communication with the neighborhood AP. The network concatenation device functions as a bridge to couple to each of the wireless devices within the home. This communication is then relayed in an efficient manner between the network concatenation device and the neighborhood AP. By using a number of neighborhood APs, rather extensive wireless coverage can be obtained.

18 Claims, 5 Drawing Sheets

(56) References Cited

U.S. PATENT DOCUMENTS

| | | |
|---|---|---|
| 2004/0008661 A1 | 1/2004 | Myles et al. |
| 2004/0022208 A1 | 2/2004 | Dahod et al. |
| 2004/0132403 A1* | 7/2004 | Alba .......................... 455/3.03 |
| 2004/0229606 A1* | 11/2004 | Oshima et al. ............. 455/426.2 |
| 2004/0233880 A1* | 11/2004 | Hyerle ........................ 370/338 |
| 2004/0235452 A1* | 11/2004 | Fischer et al. ................ 455/410 |
| 2005/0022012 A1* | 1/2005 | Bluestone et al. ............. 713/201 |
| 2005/0030907 A1* | 2/2005 | Lou et al. ...................... 370/254 |
| 2005/0078624 A1* | 4/2005 | Shu et al. ...................... 370/328 |
| 2005/0113120 A1* | 5/2005 | Rappaport et al. ........... 455/500 |
| 2005/0233749 A1* | 10/2005 | Karaoguz et al. ............. 455/442 |
| 2007/0066220 A1* | 3/2007 | Proctor et al. ................ 455/11.1 |

* cited by examiner

FIG. 5 ial Applications 60/660,786 filed Mar. 11, 2005 and 60/661,567 filed Mar. 14, 2005.

TWO-TIER WIRELESS BROADBAND ACCESS NETWORK

CROSS-REFERENCE TO RELATED APPLICATIONS

This application claims the benefit of U.S. Provisional Applications 60/660,786 filed Mar. 11, 2005 and 60/661,567 filed Mar. 14, 2005.

TECHNICAL FIELD

The present invention relates to wireless access networks and, more particularly, to the utilization of a two-tier access network useful in providing communication between a neighborhood access point (first tier) and a residence/office access point (second tier), with a network of the first tier access points then coupled into one or more backbone communication networks.

BACKGROUND OF THE INVENTION

Wireless LANs (WLANs) are defined as wireless networks that provide inexpensive, high-speed, wireless communications in office buildings, the home, public areas, and a variety of commercial and industrial locations. A "STAtion" (STA) in a WLAN can be a personal computer, a bar code scanner, or other mobile and/or stationary devices with the appropriate integrated chip set or wireless network interface card to provide the necessary connection over a wireless link to other stations. WLANs generally operate at peak speeds ranging between 1 and 54 Mbps, and have a range of between 15 and 300 meters.

Wireless LANs can provide wireless peer-to-peer communication between stations (defined as an "ad-hoc" group), as well as access to a conventional "wired" network. A single-cell WLAN using an Access Point (AP) may serve a group of stations communicating over the wireless medium, while connecting them to an external wired network. Alternatively, multi-cell WLANs provide greater range than single-cell WLANs with multiple access points interconnected by means of a wired network. An access point can be thought of as the counterpart to a base station of a mobile cellular communication system and functions as the gateway to the (wired) distribution system.

Conventional wireless LANs operate in the unlicensed portion of the spectrum, where they provide interference-free simultaneous transmission on multiple channels, each cell transmitting on a single (different) channel. The number of channels available varies with the spectrum allocation and physical layer technology. For example, the IEEE 802.11b standard provides three TDD channels for duplex data transmission at speeds up to 11 Mbps in the 2.4 GHz ISM band, while the IEEE 802.11a standard provides eight channels at speeds up to 54 Mbps in the 5 Ghz band. In some environments, however, the number of channel frequencies available is insufficient to allow each cell to operate without experiencing co-channel interference. This interference limits the quality (i.e., increases the packet error rate) of transmission to stations.

Although wireless LANs have traditionally been used for data sessions only, where errors can be overcome by retransmission of packets, the growth of multimedia content is inducing a desire for so-called "streaming" support as well. Real-time streaming applications must deliver packets without any accumulation of delays, since delay renders packets useless for reconstitution of source waveforms. An example of a streaming application is a WLAN Voice-Over-IP (VoIP) phone, for example, an IEEE 802.11b phone, that uses the WLAN to convey voice telephony. The WLAN communicatively couples the IEEE 802.11b phone to other phones across the Internet, other IEEE 802.11b phones, and/or to other phones via various communication paths.

Aside from delays due to errors caused by interference, current arrangements using a WLAN to support voice communications can also be impaired by "contention" when multiple stations attempt to simultaneously transmit their packets. If the WLAN attempts to service both voice and data communications, the WLAN may not have sufficient capacity (due to the shared nature of the channel) to hold latency below that necessary to prevent interruptions or artifacts in the telephony streams. Other services, such as video conferencing and real-time streaming IP video, can experience similar difficulties. Moreover, roaming within a WLAN (between APs) can introduce significant gaps in service, where such gaps also violate the low latency requirements of real-time streaming communication.

Additionally, wireless LANs were originally conceived for primarily indoor operation, with cell sizes on the order of 100 feet (or less) in radius. Although outdoor operation can extend the cell size to perhaps a radius of 300 feet (with a lowered transmission rate), wireless LANs that attempt to provide both indoor and outdoor coverage experience poor link quality due to the difficulty of propagating RF signals through building walls (which are known to significantly attenuate the signal).

Attempts to use outdoor/indoor single-tier (i.e., single RF link from wired network to station) wireless LAN architectures for service provider local access applications are thus challenged by these issues of signal quality, co-channel interference and the inability to provide deterministic Quality-of-Service (QoS), as particularly required for voice/streaming video applications.

SUMMARY OF THE INVENTION

The needs remaining in the prior art are addressed by the present invention, which relates to wireless access networks and, more particularly, to the utilization of a two-tier access network comprised of concatenated wireless Neighborhood Area Networks (NANs) and Local Area Networks (LANs). Such an architecture provides communication between a neighborhood access point (first tier) that establishes an outdoor coverage area and is connected to one or more backbone communication networks, and a residence/office access point (second tier) that establishes a separate indoor network serving one or more wireless stations. The two networks are cascaded (concatenated) by a specialized bridge/gateway unit (also referred to as a network concatenation device) at their joint boundary, the network concatenation device usually installed at the "edge" of the premises (e.g., outside wall or window).

In accordance with the present invention, a first tier of the wireless access arrangement thus collects wireless traffic passing to the access or backbone network from a WLAN (or conventional "wired" LAN network) and forwards it to a neighborhood access point (AP). A second tier of the connection utilizes a wireless bridging device at the home/office as both a "station" terminating the NAN connection and an access point (AP) for the local area home/office network of wireless devices. The home/office link may be based on, for example, the IEEE 802.11a/b/g standard, with the neighborhood public access link based on (for example) the IEEE 802.11a or emerging 802.11n standards.

The Neighborhood Area Network (NAN) is based on the use of "nano-cells", where each cell is on the order of 1000 feet (or less). Nanocells are sized to provide a trade-off between: (1) coverage area (established from, for example, a lamppost-height access points or base stations); (2) maintenance of high-integrity links to homes; and (3) the number of homes that can be served with broadband service. The trade-off acknowledges that NAN radio throughput is related to the amount of available spectrum, the signal-to-noise ratio of the links, the transmission rates that can be sustained with the links, and over how many homes the total throughput of the NAN cell must be divided.

The client (second tier) access point is a merging of two distinct devices; a client device that communicates via radio signals with the neighborhood access point, and a premises networking access point that provides communication between the various devices within the home/office location. In particular, a network concatenation device at the premises boundary may comprise an 802.11a station device and associated directional antenna, integrated with an 802.11b/g access point (also with a directional antenna), with "gateway" functionality interposed between the two to provide security, privacy, and network management capabilities within the home network. As such, the gateway may contain, for example, a router, firewall, performance monitor, remote configuration tool, and the like.

A preferred embodiment of the network concatenation device may be referred to as a "window bridge" inasmuch as it can be mounted on the inside of a glass window pane at the premises. The window glass provides a beneficial location for joining the NAN and WLAN networks because neither network experiences significant RF loss penetrating the glass (except for metallic-tinted windows). Accordingly, the window bridge optimizes the quality of the concatenated network connection, while permitting easy installation by a user. For example, a link quality indicator (e.g., bar graph indicator) on the unit can guide the user to the window with the best (strongest) signal from the NAN access point. However, it is to be understood that such a "window bridge" is only an exemplary embodiment of the more general "network concatenation device" of the present invention.

Advantageously, the utilization of a separate, unique network concatenation device for each home subscriber allows for the present invention to be used for multi-tenant building subscribers in apartments, malls, office parks, campuses, etc. In these multi-tenant situations, each subscriber is individually (but separately) connected to the first tier, neighborhood access point via their own (second tier) network concatenation device. Thus, each subscriber maintains a private, secure connection to the neighborhood access point. This is considered a significant advantage in that it allows separate services to be delivered to a multi-tenant building, where only some of the tenants have subscribed to the service or where there is no Ethernet wiring, or both.

It is an aspect of the present invention that existing, public wireless "hotspots" functionality may also be integrated with the two-tier access network, separating public and private access via VPN tunneling and separate authentication processes. As a result, private subscribers in the NAN may use portable devices outdoors (effectively using direct tier-1 links) while obtaining the same services and custom features as are accessible in their homes. Public users may also obtain access from the NAN access points, but are granted radio resources only on an "as available" basis, after the throughput needs of the subscribers have already been met.

Both NAN and WLAN networks preferentially use a scheduled QoS protocol, or the 802.11e HCCA operating mode. Such protocols provide strong QoS controls by suspending carrier sense multiple access (CSMA) RF medium access and substituting point-coordinated protocol based on transmission of an access request, submission of a Traffic Specification (TSPEC), execution of an admission control process, packet scheduling using Transmission Opportunities (TXOPs) and polling. Such a protocol provides deterministic QoS for various services (e.g., VoIP, video, data), as well as maintaining QoS under heavy system loads. In addition, the MediaPlex protocol provides for separate "reservation request" frames in the "contention-controlled" period where CSMA is suspended to prevent blocking of access requests.

Scheduled intervals in the "contention-controlled" interval of the 802.11 superframe can also be beneficially used to share the radio resource on a particular channel between NAN or WLAN access points, with appropriate synchronization between the access points. A separate communication channel may be used to maintain synchronization between the neighborhood access points, or synchronization may be achieved by allowing a second AP to be responsive to beacon timing of a first AP. By sharing time intervals in the superframe contention-controlled period, APs may operate nearby on the same RF channel without interfering with one another.

Other and further aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
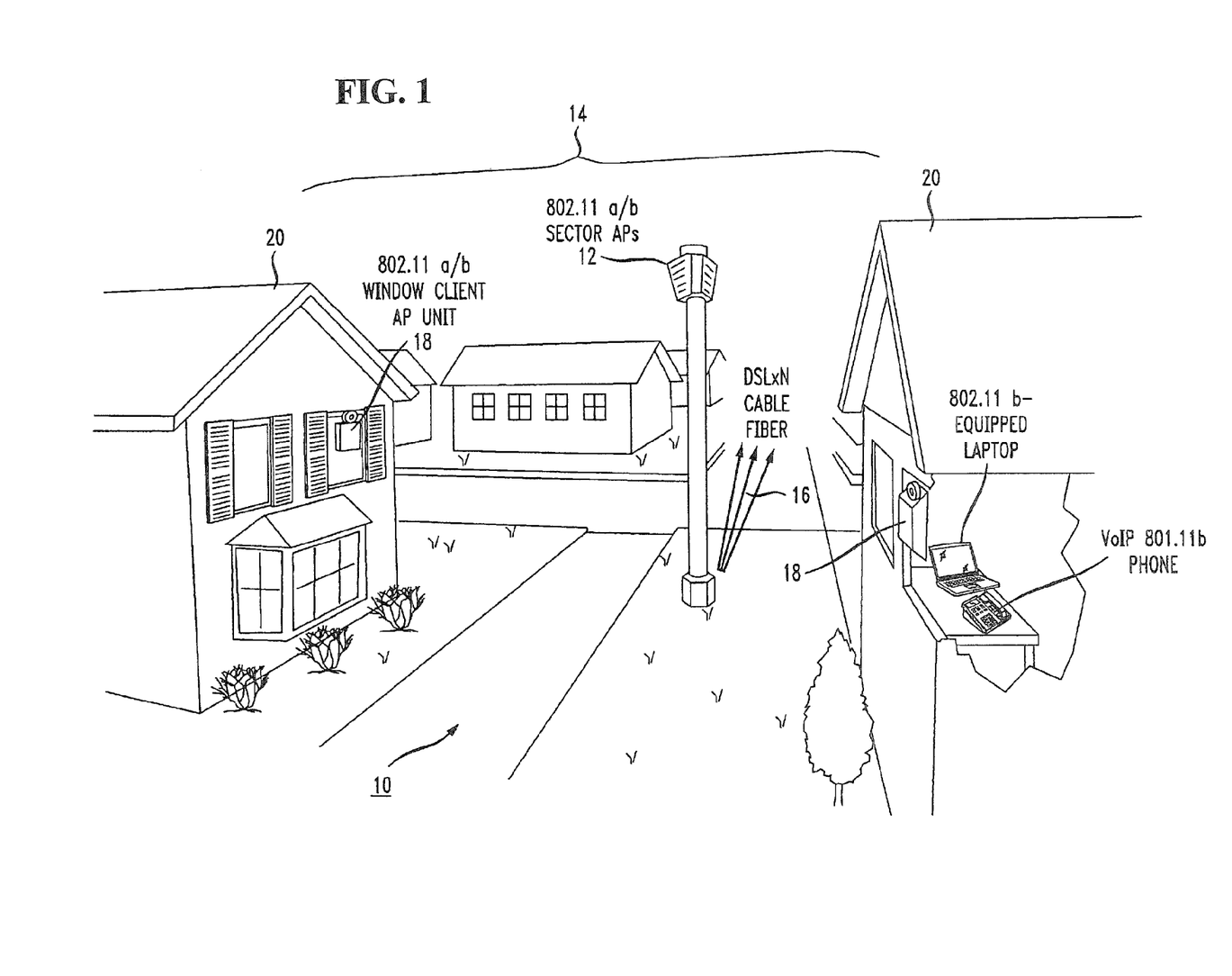
FIG. 1 illustrates an exemplary environment for implementing the two-tier access arrangement of the present invention in a residential setting.
Figure 2:
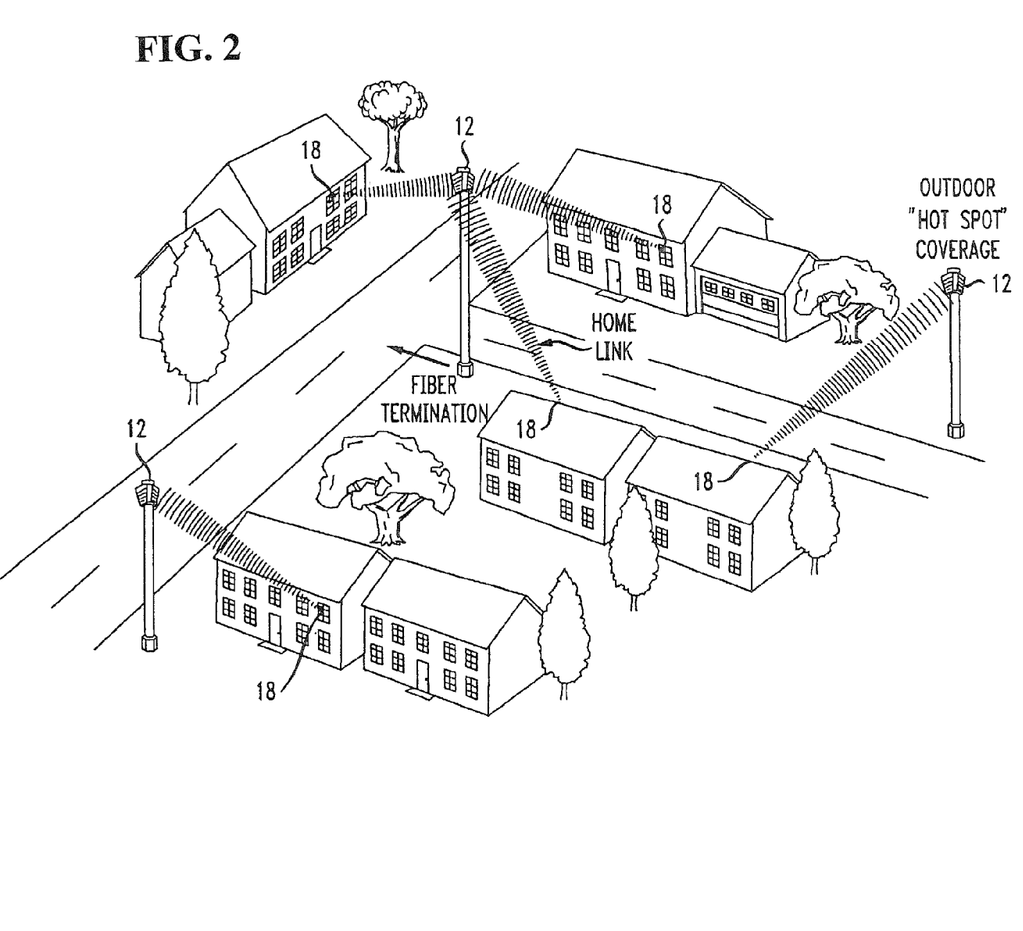
FIG. 2 is an artistic rendering of an exemplary neighborhood area in which the access arrangement of the present invention may be employed.

FIG. 1 illustrates an exemplary arrangement 10 for implementing the two-tier wireless broadband access system of the present invention. As shown, arrangement 10 includes a Neighborhood Area Network (NAN) access point (AP) 12 which is (preferably) centrally disposed within a nanocell 14, the nanocell itself composed of multiple sectors defined by separate APs and associated directional antennas. Each sector is capable of transmitting/receiving relatively low power signals (compatible with license-free operation) with AP 12. For example, each AP 12 may "illuminate" a segment area covering a radius of 1000 feet (or less). In a typical neighborhood, therefore, a single wireless AP 12 may communication with a relatively few houses (or buildings). FIG. 2 contains a simple diagram of an exemplary residential setting in which a plurality of NAN APs 12 are used to provide communication within a neighborhood.

Wireless AP 12, as shown in FIG. 1, can be installed within a device similar to a utility pole, and includes a network connection 16 to a "backbone" wired network (not shown). Network connection 16 may comprise, for example, a coaxial cable connection, a fiber optic cable, free-space optical signal path, or a copper pair network connection (e.g., DSL). Wireless AP 12 is defined as the base station of the "first tier" of the two-tier access system, and provides communication using a conventional wireless communication standard, PHY, such as IEEE 802.11a/b/g, or a MAC protocol such as 802.11e HCCA. It is to be understood, however, that the two-tier access point arrangement of the present invention is equally applicable with other wireless communication system standards. Throughout the remainder of the discussion, therefore, the use of the IEEE 802.11a/b/g PHY standards and/or the 802.11e MAC standard should be considered as exemplary only.

In accordance with the present invention, broadband wireless access for the home is provided by using a network concatenation device (in one embodiment, a "window bridge") 18, consisting of an access point that establishes the "second tier" of the access network to provide communication with one or more "stations" within the building. The network concatenation device includes a gateway processor/router attached to a permanent facility (such as residence 20 in FIG. 1) at a location on the facility that is capable of receiving a radio signal from wireless AP 12 and "illuminating" the interior of the residence with the RF signal for the second tier network. Indeed, during the installation process, a homeowner may walk through the house with network concatenation device 18 in hand and ascertain the location with the strongest signal and then attach network concatenation device 18 to a window at that location. Advantageously, network concatenation device 18 may be attached to the inside of a window, since glass is transparent to radio signals. Another network concatenation device 18 is illustrated as attached to a second residence 22 in FIG. 1. Referring to the block diagram of FIG. 2, a set of network concatenation devices 18 is illustrated as located at each home in communication with its associated neighborhood wireless AP 12. Those homes outside the border of a particular nanocell 14 will inevitably receive a stronger signal from another wireless AP disposed further along the street (although any portable device that enters a certain nanocell 14 will be able to communicate through this cell with the backbone network—in much the same manner as a cellphone call experiences "hand-off" between cells as the caller moves from destination to destination).

Figure 3:
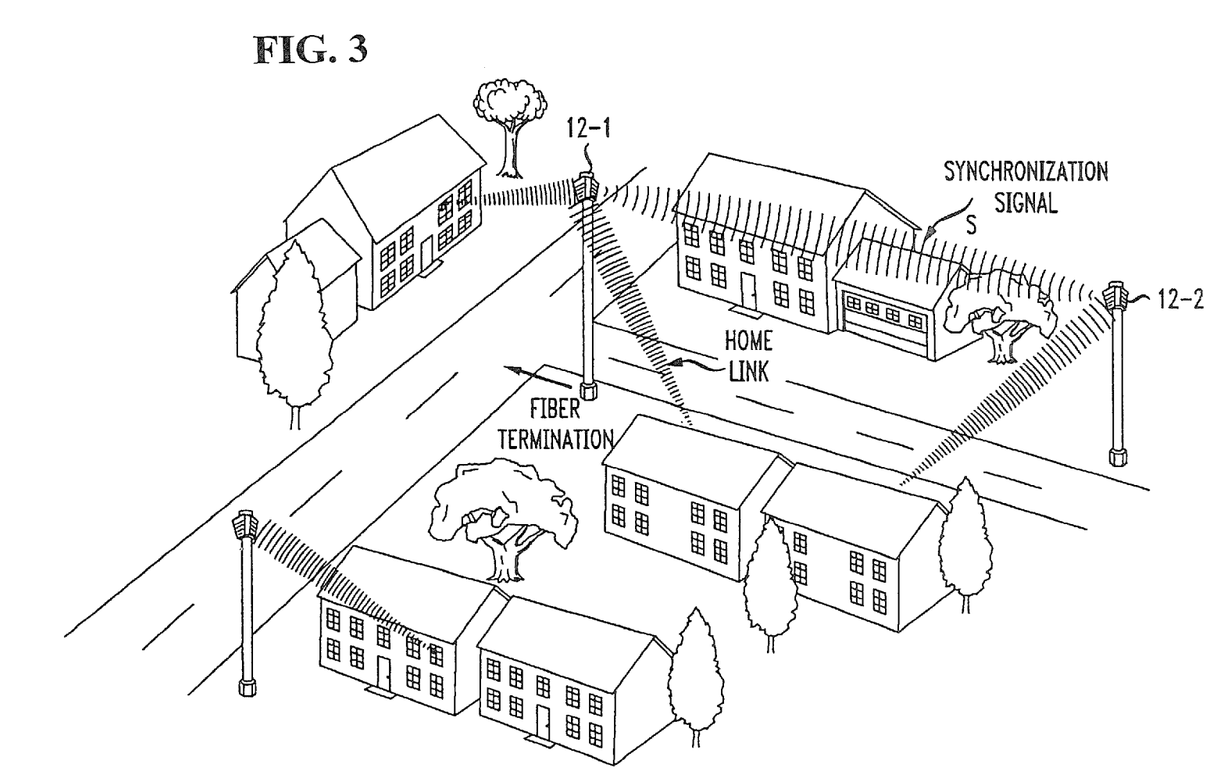
FIG. 3 contains a similar illustration as FIG. 2, in this case illustrating the presence of a synchronization signal between the various neighborhood (first tier) access points.

In order to maintain accurate and reliable communication between nanocells, a synchronization signal is transmitted between the group of neighborhood wireless APs 12. FIG. 3 contains a diagram of the same neighborhood illustration as shown in FIG. 2, in this case also illustrating the presence of a synchronization signal S used between a first neighborhood access point AP 12-1 and a second neighborhood AP 12-2.

Figure 4:
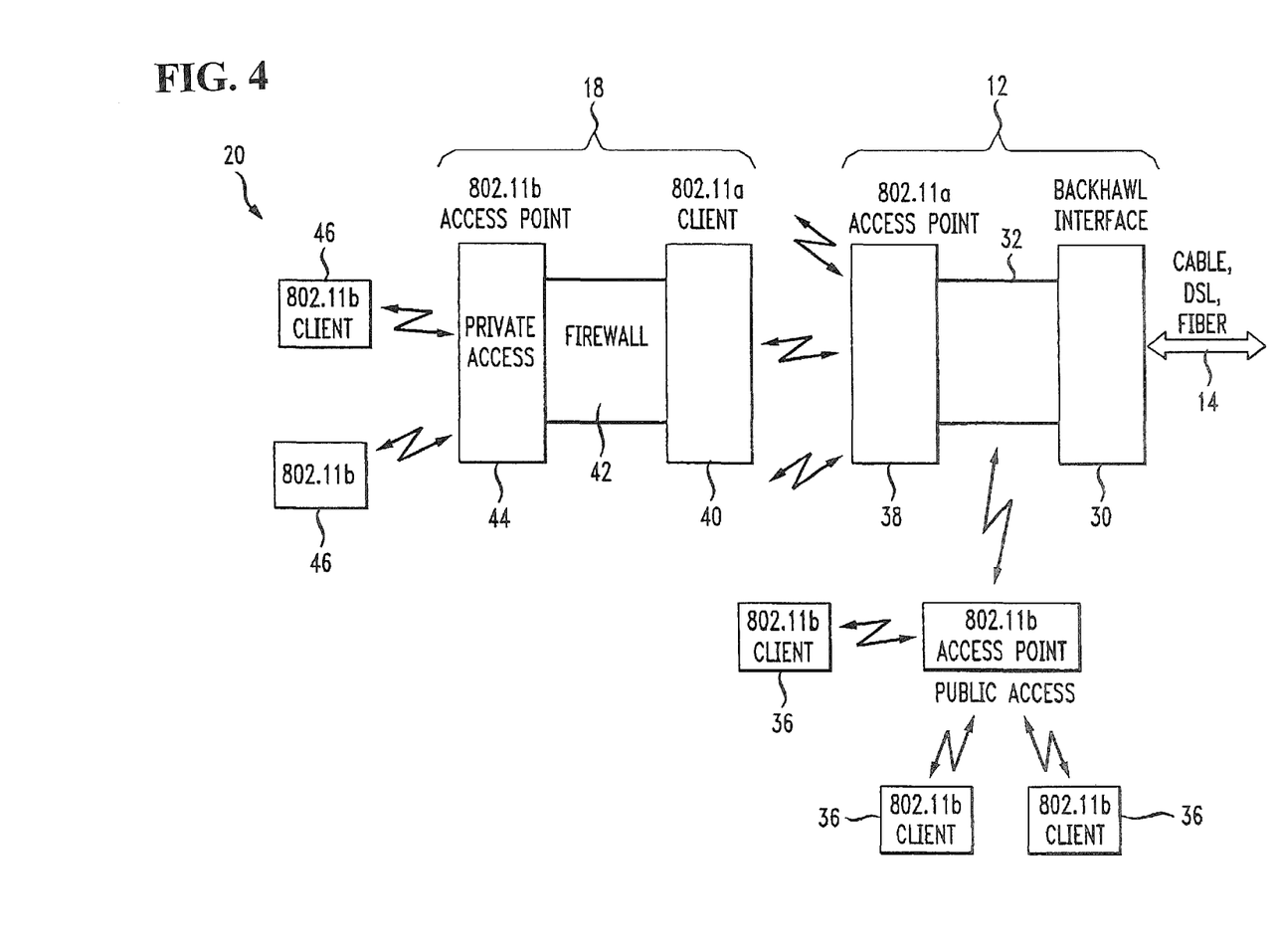
FIG. 4 is a block diagram of the various elements required to implement the inventive access arrangement of FIG. 1.

FIG. 4 contains a high-level block diagram of the various components utilized to implement the two-tier broadband wireless access network in accordance with the present invention. As shown, neighborhood access point 12 includes a backhaul interface 30 that functions to re-package transmissions between the wireless standard used in the neighborhood and the particular "wired" standard used along network connection 16. A wireless router 32 is coupled to interface 30 and is used to direct wireless traffic between "public access" users of that particular access point as a "hotspot", and the "private" network concatenation devices 18 associated with nanocell 14. As shown, traffic associated with "public" communications may flow through neighborhood AP 12, or may be accommodated by a separate 802.11b public access point 34 co-located with AP 12, where it may thereafter communicate with any 802.11b client terminals 36 in its vicinity.

The 802.11a traffic associated with communication within nanocell 14 is thereafter directed by router 32 into an 802.11a access point module 38, which serves to broadcast/receive wireless transmissions between the various network concatenation devices 18. As shown in FIG. 4, an exemplary network concatenation device 18 will comprise an 802.11a client device 40 for communicating with the 802.11a access point module 38 (at neighborhood AP 12). The received information then passes through a gateway 42 and enters an 802.11b/g access point 44 (a private access point requiring validation), where access point 44 is thereafter connected to one or more 802.11b/g client devices 46 within residence 20 (FIG. 1 illustrating an 802.11b-equipped laptop computer and an 802.11b-equipped VoIP phone as two exemplary "client devices").

Figure 5:
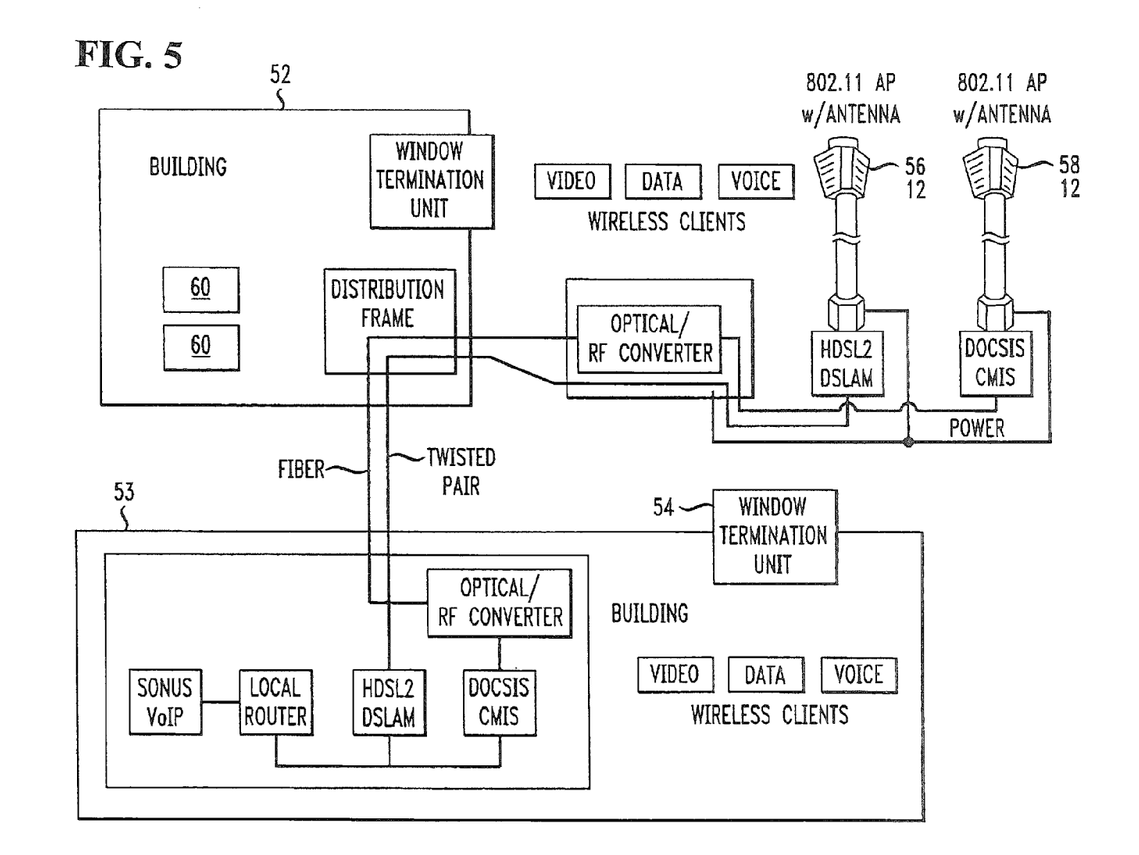
FIG. 5 illustrates an alternative environment for implementing the present invention, in this case in an industrial/corporate/campus environment.

FIG. 5 illustrates a portion of a campus-like arrangement 50 for utilizing the two-tier wireless access configuration of the present invention. A first facility 52 (possibly a residential building) and a second facility 53 (possibly a classroom/lab building) are shown, each including a network concatenation device 54. A pair of neighborhood access points 56, 58 are shown as disposed in a campus area that can freely communication through the "open air" with network concatenation devices 54. Indeed, each network concatenation device 54 is installed in a window capable of receiving radio signals from (and transmitting signals to) neighborhood access points 56, 58. A set of wireless client devices 60 is shown in first facility 52, where these devices may comprise laptop computers associated with students who reside in this building. A second set of client devices 62 is shown in second facility 53, where these may be VoIP phones, laptops and other wireless devices useful in a classroom/laboratory setting. Other wireless client devices 64 are shown as within a nanocell 70 covered by neighborhood access points 56, 58.

In this case, a pair of neighborhood access points is used, with access point 56 coupled to a conventional telephone line (twisted pair) 72 backbone communication path, where this communication path is also connected to both facilities 52 and 53. A DSL modem 74 is used within neighborhood access point 56 to generate the wireless, RF output that is broadcast to all of the wireless client devices within range, particularly to window bridge units 54, where window bridge units 54 then distribute the signals to all associated client devices, as discussed above. In its other "mode", neighborhood access point 56 functions as a "hotspot" (using the IEEE 802.11b standard, for example) to communicate with mobile client devices 64. Neighborhood access point 58 is shown as coupled to a fiber optic backbone path 76 that is also connected through facilities 52, 53. An optical/RF converter 78 is used to translate between the optical and radio domains, and a modem 80 is used to generate the radio output signal that is broadcast by access point 58.

Although this invention has been described with a certain degree of particularity, it is to be understood that the present disclosure has been made by way of preferred embodiments only and that numerous changes in the detailed construction and combination as well as arrangement of parts may be resorted to without departing from the spirit and scope of the invention as hereinafter set forth.

What is claimed is:

1. A broadband wireless access network comprising:
 a plurality of neighborhood access points, coupled to a backbone communication network, wherein each neighborhood access point is configured to provide public access wireless communication and private access wireless communication within a defined nanocell coverage area, wherein the public access wireless communication is provided when available throughput needs of network subscribers to the private access wireless communication are met, and wherein a particular communication channel is used by the plurality of neighborhood access points to maintain synchronization between the plurality of neighborhood access points to enable shared use of a second communication channel by adjacent nanocells; and a plurality of network concatenation devices, each network concatenation device of the plurality of network concatenation devices uniquely associated with a network subscriber, wherein each network concatenation device is configured to form an indoor network serving a communication device at a location associated with a corresponding network subscriber.

2. The broadband wireless access network of claim 1, wherein wireless communication between a particular network concatenation device and an associated neighborhood access point is defined as a private access communication.

3. The broadband wireless access network of claim 2, wherein the private access communication is provided using a wireless Ethernet standard.

4. The broadband wireless access network of claim 1, wherein a neighborhood access point of the plurality of neighborhood access points comprises an access interface configured to directly communicate with mobile wireless client devices within the defined nanocell coverage area.

5. The broadband wireless access network of claim 4, wherein the neighborhood access point communicates with the mobile wireless client devices based on a wireless Ethernet standard.

6. The broadband wireless access network of claim 1, wherein the plurality of communication device includes a voice over internet protocol phone, a wireless laptop computer, or a wireless gaming device.

7. The broadband wireless access network of claim 1,
wherein a unique set of network concatenation devices is associated with each neighborhood access point, and
wherein a particular network concatenation device of a particular unique set of network concatenation devices associated with a particular neighborhood access point individually and separately communicates with the particular neighborhood access point, without direct communication between the particular network concatenation device and other network concatenation devices.

8. The broadband wireless access network of claim 1, wherein a network concatenation device of the plurality of network concatenation devices is configured to mount on a glass window and is configured to facilitate wireless communication between a neighborhood access point associated with the network concatenation device and a particular communication device associated with the network concatenation device.

9. The broadband wireless access network of claim 1, wherein the backbone communication network comprises a telecommunications network.

10. The broadband wireless access network of claim 9, wherein the telecommunications network utilizes a digital subscriber loop system.

11. The broadband wireless access network of claim 1, wherein the backbone communication network comprises a fiber optic communication network.

12. The broadband wireless access network of claim 1, wherein the backbone communication network comprises a free-space optical network.

13. The broadband wireless access network of claim 1, wherein a neighborhood access point of the plurality of neighboring access points forms a first tier network connection, and wherein a network concatenation device coupled to the neighborhood access point forms a second tier network connection.

14. The broadband wireless access network of claim 13, wherein the network concatenation device comprises a neighborhood area network station including a directional antenna, a gateway function device with selective routing capabilities, and a wireless local access network access point interface associated with the directional antenna.

15. The broadband wireless access network of claim 13, wherein the network concatenation device comprises a wired Ethernet interface.

16. The broadband wireless access network of claim 13, wherein the network concatenation device is further configured to provide remote configuration, performance monitoring, a firewall, network address translation, and virtual private network tunneling support.

17. The broadband wireless access network of claim 13, wherein the network concatenation device further comprises a graphical user interface configured to display signal strength infatuation that enables a user to determine a mounting location for the network concatenation device.

18. A method of providing wireless communication between a backbone communication network and a plurality of subscriber locations, the method comprising:
establishing a first tier of a two-tier broadband wireless access network, the first tier including a first neighborhood access point configured to provide public access wireless communication and private access wireless communication within a first nanocell coverage area, wherein the public access wireless communication is provided when available throughput needs of subscribers having access to the private access wireless communication are met, and wherein the first nanocell coverage area has a radius less than or equal to one thousand feet;
establishing a second tier of the two-tier broadband wireless access network, the second tier including a plurality of network concatenation devices, wherein each network concatenation device is configured to form an indoor network serving a communication device at a location associated with a corresponding subscriber;
maintaining synchronization via a particular communication channel between the first neighborhood access point and a second neighborhood access point to enable shared use by the first neighborhood access point and the second neighborhood access point of a second communication channel, wherein the first nanocell coverage area is adjacent to a second nanocell coverage area associated with the second neighborhood access point; and
providing private access wireless communication via the first neighborhood access point to a portable communication device associated with a particular network concatenation device when the portable communication device is within the nanocell coverage area and outside of an area serviced by the indoor network associated with the particular network concatenation device.

* * * * *

UNITED STATES PATENT AND TRADEMARK OFFICE
CERTIFICATE OF CORRECTION

PATENT NO.       : 8,625,547 B1
APPLICATION NO.  : 11/371578
DATED            : January 7, 2014
INVENTOR(S)      : Robert Raymond Miller, II Page 1 of 1

It is certified that error appears in the above-identified patent and that said Letters Patent is hereby corrected as shown below:

In the Claims

Column 7, Claim 6, Line 34, "wherein the plurality of communication device includes a" should read --wherein the communication device includes a--.

Column 8, Claim 17, Lines 27-28, "strength infatuation that enables a user to determine a mounting location for the network concatenation device." should read --strength information that enables a user to determine a mounting location for the network concatenation device.--.

Signed and Sealed this
First Day of July, 2014

Michelle K. Lee
*Deputy Director of the United States Patent and Trademark Office*